United States Patent
Bajek et al.

[15] 3,668,392
[45] June 6, 1972

[54] RADIOACTIVE RADIATION-TYPE FLUID INTERFACE DETECTION SYSTEM

[72] Inventors: Walter A. Bajek, Lombard; David M. Boyd, Jr., Clarendon Hills, both of Ill.

[73] Assignee: Universal Oil Products Company, Des Plaines, Ill.

[22] Filed: May 20, 1969

[21] Appl. No.: 827,122

Related U.S. Application Data

[63] Continuation of Ser. No. 454,519, May 10, 1965, abandoned.

[52] U.S. Cl. ................................. 250/43.5 D, 250/43.5 FL
[51] Int. Cl. .................................................. G01n 23/10
[58] Field of Search .................. 250/43.5 FL, 43.5 D, 83.3 D

[56] References Cited

UNITED STATES PATENTS

| | | | |
|---|---|---|---|
| 2,316,239 | 4/1943 | Hare | 250/43.5 D |
| 2,613,325 | 10/1952 | Herzog | 250/43.5 D |
| 2,708,721 | 5/1955 | Ziffer | 250/43.5 |
| 2,960,607 | 11/1960 | Kohl | 250/43.5 FL |
| 2,961,539 | 11/1960 | Egan et al. | 250/43.5 |
| 3,210,545 | 10/1965 | Barnett | 250/83.3 |
| 3,284,630 | 11/1966 | Clark | 250/43.5 FL |

FOREIGN PATENTS OR APPLICATIONS

| | | | |
|---|---|---|---|
| 986,109 | 3/1965 | Great Britain | 250/43.5 |
| 1,094,475 | 12/1960 | Germany | 250/43.5 FL |

OTHER PUBLICATIONS

Industrial Process Measuring Instruments, by G. C. Carroll, McGraw-Hill Book Co., 1962, pgs. 182, 183.

*Primary Examiner*—Archie R. Borchelt
*Attorney*—James R. Hoatson, Jr. and William H. Page, II

[57] ABSTRACT

Method and apparatus for locating one or more liquid-liquid interfaces within a closed vessel utilizing a radiation-type interface detector. A traveling radiation source within the vessel and a traveling radiation detector outside the vessel, the paths of travel of both being vertical and the speed of both being synchronized, are used to provide constant path length therebetween. The instrument output is in the nature of a density profile.

13 Claims, 5 Drawing Figures

PATENTED JUN 6 1972  3,668,392

RADIOACTIVE RADIATION-TYPE FLUID INTERFACE DETECTION SYSTEM

This is a Continuation of Ser. No. 454,519 filed May 10, 1965, now abandoned.

This invention relates to apparatus for locating the interface, or plane of contact, between two superimposed immiscible liquid phases within a closed vessel. More particularly, the invention is directed to interface sensing apparatus comprising a traveling radiation source within the vessel and a traveling radiation detector without the vessel, the motion of both being synchronized to provide constant path length therebetween.

Various equipments utilizing gamma-ray absorption techniques for determining liquid levels or densities within closed tanks are well known in the art. The operation of all such apparatus is based on the principle that materials of different density, composition or concentration often possess different gamma-ray absorption coefficients. Also, the degree of absorption is dependent on the path length through the absorbing medium. If the path length is constant, the radiation intensity at the receiver is correlatable with composition, density or concentration changes. If the composition or concentration is constant, the radiation intensity at the receiver varies with path length and so provides an indication of level or inventory.

Gamma-ray level gauges of the prior art generally comprise one or more fixed sources of radioactivity positioned with the vessel and one or more radiation detectors positioned outside of the vessel. At the present state of the art, their application has been limited to monitoring vapor-liquid interfaces, eg, simple liquid level, and gas-solid interfaces, eg, level of granulated or particle-form solids in compact or fluidized beds. Attempts to monitor liquid-liquid interfaces by gamma-ray absorption have not been successful because such measurements depend on the difference of absorption coefficients as between two liquid phases; this difference is often very small and, when coupled with a substantial path length through both phases, the resultant sensitivity to a change in elevation of the interface is extremely poor. In other words, the elevation of the liquid-liquid interface will vary appreciably without producing a detectable change in the output signal of the readout device. In addition to unsuitability for detecting liquid-liquid interfaces, conventional gamma-ray level gauges have the further drawback of limited rangeability, typically of the order of two to three feet maximum level displacement. For greater rangeability it is necessary to install a number of vertically spaced radiation sources in the vessel, thereby increasing the cost and complexity of the level detecting system.

The present invention achieves, as one of its principal objectives, the accurate locating of one or more liquid-liquid interfaces within a closed vessel. Of course, the invention is also eminently well adapted for services having lower sensitivity requirements such as locating vapor-liquid interfaces (liquid level) and gas-solids interfaces (solids level). Furthermore, the instant apparatus has virtually unlimited rangeability while requiring only a single radiation source. Unlike conventional gamma-ray level gauges employing analog readout, the output of the present instrument is digital in nature, in that a simple step change in signal magnitude, rather than a continuous absolute signal magnitude, conveys the desired information; thus there is eliminated the need for a super-stable power source as well as extensive system calibration. In addition, the present instrument is particularly suitable for the use with multiple stacked vessels, whereby the interface or level in each of several vertically stacked vessels may be monitored by a single source-detector combination.

The types of vessels with which our invention may be employed include storage tanks, vapor-liquid separators, liquid-liquid separators, fluidized bed reactors and regenerators, liquid-liquid extraction columns, and fractionating, absorption and stripping columns of all kinds. Naturally the material of construction of the vessel should be selected, in relation to the vessel wall thickness, such that the intensity of the transmitted radiation will not be unduly attenuated. As a general rule, satisfactory signal-to-noise ratios well prevail for vessel wall thicknesses of up to 6 inches for carbon, alloy and stainless steels, and up to 20 inches for refractory lined vessels using relatively small quantities of radioactive material. Our invention has obvious advantages in services where the process medium is highly corrosive, such as reactors and separators in HF or $H_2SO_4$ alkylation plants, wherein experience has shown that conventional float type level instruments usually prove inoperative or unreliable after a few weeks' operating time.

Briefly described, the interface sensing apparatus of our invention comprises a radiation source housing having the form of a substantially vertical conduit supported within the vessel and extending through a wall thereof to the exterior of the vessel, at least that portion of the conduit which is within the vessel being imperforate and fluid-tight; a vertically translatable radiation source within the conduit arranged to emit radiation outwardly through the conduit and a wall of the vessel; a vertically translatable radiation detector means disposed exteriorly of the vessel and substantially horizontally of the source in a position to intercept and receive radiation emitted therefrom; drive means coupled to the source and to the detector for synchronously raising and lowering the source and detector means in parallel paths of travel; and readout means, such as an indicator or strip chart recorder, electrically coupled to the detector means.

The conduit serving as the radiation source housing fulfills several important functions including (1) isolation of the source and drive mechanism from the process medium within the vessel proper, which process medium may be at high temperature or under high pressure or may be corrosive to the source materials of construction and (2) guiding the source along a predetermined path of travel. This conduit need not be perfectly vertical or plumb, but should have a substantial inclination to the horizontal so as to extend through all the process phases to be scanned without occupying excessive horizontal space, and also to permit free travel of the radiation source within it. In general, the conduit as installed may deviate as much as 10°-15° from the vertical and still be deemed substantially vertical for the purposes of the invention. The vertical conduit projects for a substantial distance into the vessel and preferably extends through either the upper endwall of the vessel or the lower endwall thereof, being also mechanically supported by such endwall as by a welded or flanged connection. In a preferred embodiment of the invention, the source housing conduit extends completely through the vessel and also through both upper and lower endwalls; preferably the conduit is installed as plumb as possible for simplicity of reading analysis. Where several vessels are vertically stacked on a common axis, the source housing conduit may extend through all such vessels. The source housing conduit is desirably centered on a line parallel to and radially displaced from the central longitudinal axis of the vessel, and for a reasonably safe source intensity with regard to exposure to personnel, may be spaced a distance of about 0.5-3 feet from the portion of the vertical wall of the vessel with is contiguous to the exteriorly positioned radiation detector. In general, however, such distance may be increased up to as much as 10-20 feet depending on specific densities involved. In other words, the path length through the absorbing process medium is usually about 0.5-20 feet, less the wall thickness of the source housing conduit.

The traveling radiation source may comprise any natural emitter of gamma rays having a reasonably long half-life, such as radium 226, cobalt 60, cesium 137, europium 154, europium 155, and thorium 228. The radioactive material may be utilized as the element metal or in the form of an inorganic or organic compound thereof. The source may be a capsulated point source, that is, the radioactive material is encased in a lead sheath with a directional slit in the sheath to furnish a narrow unidirectional beam of gamma rays, or the source may be so constructed as to radiate more or less indiscriminately in all directions.

The traveling radiation detector may be any appropriate instrument known to the art such as a Geiger-Mueller counter, proportional counter or scaler, scintillation counter, ionization chamber or atomic battery. The detector is adapted to move adjacent to or along the exterior vertical wall of the vessel, parallel with and in synchronism with the internal radiation source; preferably the detector is positioned substantially horizontally of the source, which definition includes not only exact horizontal alignment but also a vertical displacement of up to about 2 feet above or below a horizontal line passing through the source. Naturally a more precise alignment will be required for a point source than for an unshielded source. The detector may obtain its operating power from a self-contained battery or may be connected to a standard AC power source through a flexible cable. For outdoor or refinery class service, the detector may be provided with a ruggedized weatherproof or explosion-proof housing as the situation may warrant. In a preferred embodiment of our invention, there is provided along the exterior wall of the vessel a detector guide means, such as a track, elongate cage or shield for engaging the traveling detector and eliminating undesirable transverse motion thereof as might be imparted by wind or vibration.

The drive means for synchronously raising and lowering the source and detector may comprise a pair of wire cables, tapes or chains connected to the source and detector respectively and driven by a reversible electric motor or air motor through a system of sheaves, drums, sprockets, weight and/or spring loaded, or the like. The source and detector may ride on a single cable, tape or chain arranged in a triple sheave, double-loop system, with one sheave being driven by a reversible prime mover and the other two sheaves idling. Alternatively, when the required vertical displacement is not too great, the source and detector may be positioned by means of reciprocable rods or shafts actuated by pneumatic or hydraulic pistons. Other equivalent drive systems will be apparent to those skilled in the mechanical arts.

The electrical output of the radiation detector is fed through signal leads to a suitable readout device such as a strip chart or x-y recorder. The readout device may be mounted locally near the vessel or remotely in a control house. During a given traverse of the vessel height by the source-detector combination, the location of an interface is indicated by a relatively sharp step change or transition from one signal level to another. The recorder chart drive may be manually synchronized with the source-detector drive means, or may be positively actuated thereby through a position servo, so that the location of the interface may be directly observed from the chart in terms of vessel height. As will be more fully described hereinafter, the interface sensing apparatus of this invention may be incorporated directly into a closed loop control system of the sampled data input type.

The arrangement and operation of our invention can be more clearly described with reference to the accompanying drawings in which.

Figure 1:
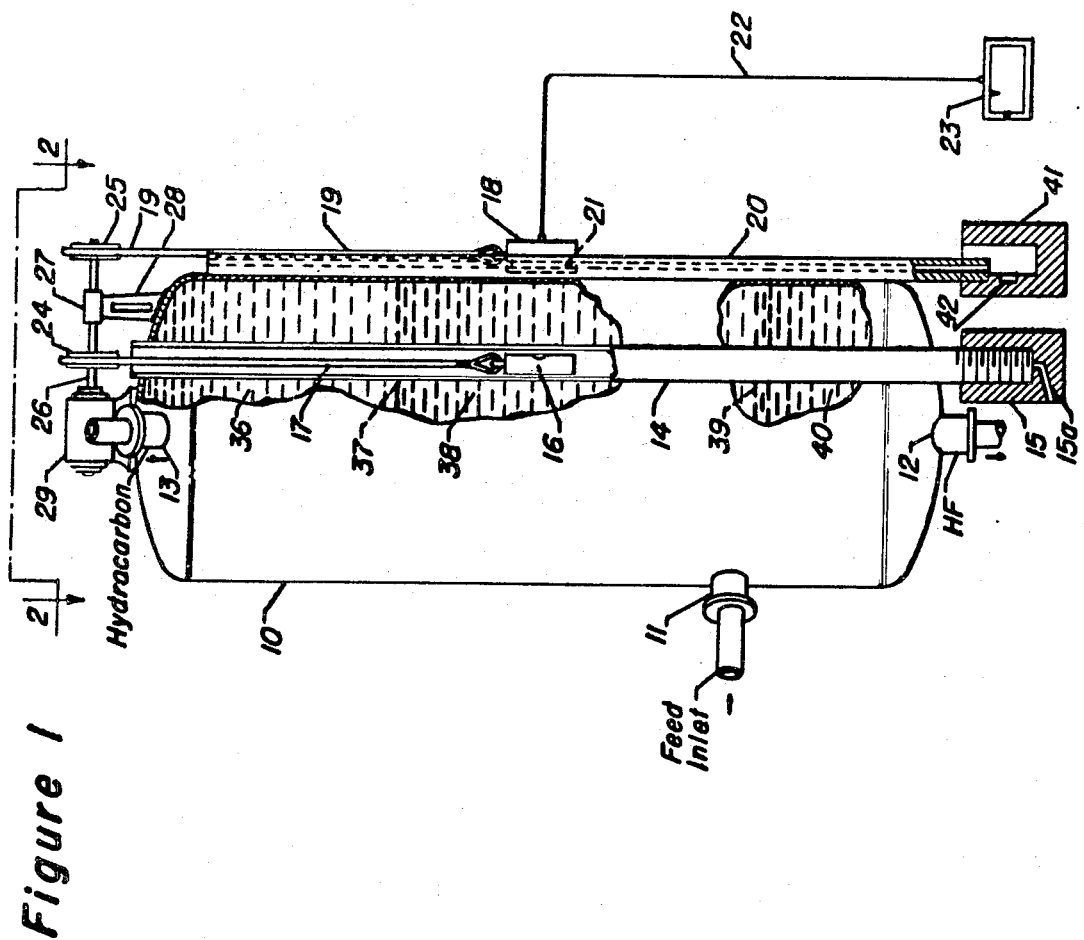
FIG. 1 is a partially sectioned elevation view of a typical embodiment of the invention including a vessel and level detecting system.

In FIG. 1, numeral 10 designates a vertically elongated cylindrical vessel serving as an acid settler or gravity-type separator in an HF alkylation unit producing motor alkylate. The feed to separator 10, introduced through nozzle 11, is reactor effluent comprising liquid HF, alkylate product, excess isobutane and a small amount of unreacted propylene and/or butylenes. Separator 10 runs liquid-full, at a temperature of 35°–50° F. and pressure of about 100 psig, and in normal operation contains three distinct phases: an upper layer 36 of hydrocarbon containing dissolved HF, an intermediate layer 38 consisting of an HF-hydrocarbon emulsion, and a lower layer 40 of HF. Hydrofluoric acid underflow is withdrawn through a lower nozzle 12 for recycle to the reactor. Hydrocarbon overflow is withdrawn through an upper nozzle 13 and is charged to a downstream fractionator train. The hydrocarbon-emulsion interface is denoted by numeral 37 and the HF-emulsion interface is denoted by numeral 39. For a given vessel size, the particular location of the interfaces is the function of feed rate and hydrocarbon/acid ratio. Current knowledge of interface height is very important to the successful operation of the alkylation process: first, to permit computation of acid inventory in the plant, and second, to insure optimum operation of the acid settler itself. In particular, it has been found that the height of the emulsion phase is extremely sensitive to throughput, increasing rapidly with feed rate. Therefore, considerable care must be exercised not to "lose an interface" e.g., allow the emulsion phase to escape the separator, either in the overhead or in the underflow.

Automatic control of the feed rate and/or acid recycle rate in response to interface levels would be highly desirable to achieve maximum settler loading but has not been practicably realizable with conventional level sensing apparatus. According to previous practice, it was customary to use two float type level transmitters, one for each interface; after a few weeks' operating time, however, these became clogged with fluorides and acid sludge accumulation and so required frequent and expensive maintenance. It was also customary to provide manual backup instrumentation such as plurality of sight glasses and trycocks. These accessories required numerous vessel nozzles, nipples, gate valves and external manifolding costing several thousand dollars for a commercially scaled settler, and yet all such instrumentation still failed to provide continuous and reliable interface readings. In particular, readings obtained from any externally mounted level instrument are highly sensitive to ambient temperature changes which are virtually impossible to compensate for. Our invention makes it possible for the first time to achieve full automatic control of an acid settler.

With further reference to FIG. 1, there is provided a vertical steel tubular conduit 14 extending the full height of separator 10 and also projecting through the upper and lower elliptical heads or endwalls of separator 10, being welded to the heads to form fluid-tight junctures therewith. Conduit 14 may have a non-circular cross-section, eg, square or rectangular, if desired. The lower external end of conduit 14 is capped with a lead radiation shield 15. Since the liquid contents of the separator are often at sub-ambient temperature which may fall below ambient dewpoint temperature, a condensate drain 15a, angularly bored through shield 15, prevents atmospheric condensate from accumulating within conduit 14. A vertically translatable radiation source 16, positioned within conduit 14, rides on a wire rope or cable 17 connected thereto. A vertically translatable radiation detector 18 is positioned exteriorly of the separator and horizontally of the source 16; detector 18 is raised and lowered by a cable 19 and rides in guide tracks 20 slideably engaged therewith.

Tracks 20 project below the bottom of separator 10 and terminate within a bored lead block or casing 41. The bore of casing 41 is large enough to permit entry of detector 18 when moved into its lowermost position. A calibration disc 42, containing a small quantity of radioactive material having a known radiation intensity, is embedded or otherwise mounted in a recess in the wall of the bore. By this means, the calibration of the detector may be periodically checked simply by running the detector all the way down into block 41 so that its receiver aperture comes into alignment with disc 42. The purpose of block 41 is to shield the detector from scatter radiation from source 16 during the calibration check.

Figure 3:
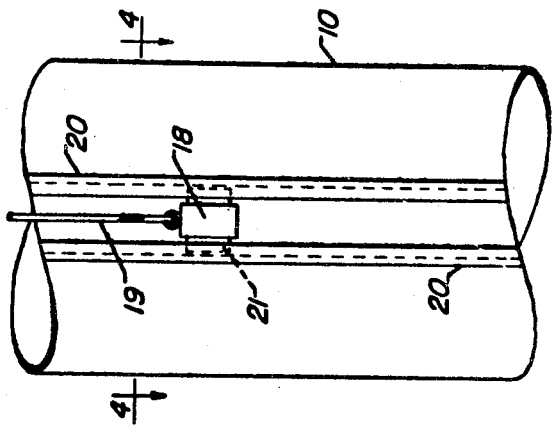
FIG. 3 is an enlarged elevation view of the apparatus taken along line 3—3 of FIG. 2 and showing one form of the detector guide means.
Figure 4:
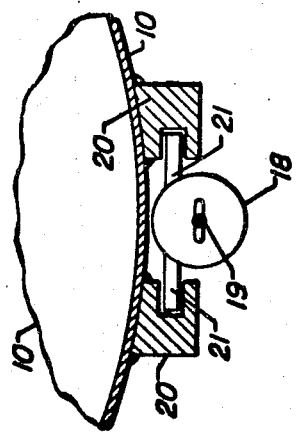
FIG. 4 is an enlarged sectional plan view of the detector guide means taken along 4—4 of FIG. 3.

The detector guide means is shown in greater detail in FIGS. 3 and 4, to which reference is now made. A pair of parallel tracks 20, having a wide flange or I-beam cross-section, are connected to the vessel wall in a line parallel with the path of travel of source 16. The opposing inner slots of tracks 20 receive corresponding lugs 21 connected to the body or housing of detector 18. Lugs 21 are in sliding engagement with the recesses of tracks 20 and thus prevent lateral or transverse motion of the detector while permitting free vertical travel thereof. If desired, lugs 21 may carry spring means in sliding engagement with tracks 20 or may be fitted with spring-loaded ball bearings to reduce friction. Alternatively, the detector guide means may take the form of an elongated woven wire cage or semi-cylindrical trough coextensive with the path of travel and oriented concave inwardly so as to surround or enclose the detector.

Figure 2:
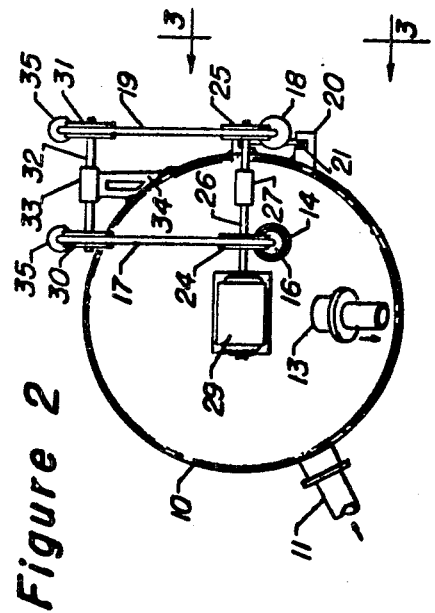
FIG. 2 is a plan view of the apparatus taken along line 2—2 of FIG. 1 illustrating the particular arrangement of the mechanical drive means.

With further reference to FIGS. 1 and 2, the source-detector drive means comprises cables 17 and 19 which are driven by sheaves 24 and 25, respectively, cable 17 running through the upper open end of conduit 14. Sheaves 24 and 25 are keyed to a common shaft 26. Shaft 26 is rotatably supported by a sleeve bearing 27 which in turn is supported by a strut 28 welded to the upper head of vessel 10. Shaft 26 is driven by a reversible electric motor 29; the mechanical power for the drive may be taken through a fixed or variable speed reducer (not shown). Cables 17 and 19 are run across the top of the vessel and over idler sheaves 30 and 31, respectively, the latter being keyed to a common free-running shaft 32. Shaft 32 is rotatably supported by a sleeve bearing 33 which in turn is supported by a strut 34 welded to the upper head of vessel 10. Shaft 32 is so positioned as to provide adequate overhang for counterweights 35 which are connected to the free ends of each of the cables 17 and 19. Hoisting means other than cable wires or ropes may be utilized, as, for example, chains, tapes, or piston rods and/or spring loaded type. Motor 29 may be manually controlled by a push-button station located at grade or in a control house; alternatively, the apparatus may incorporate an automatic scan cycle whereby a programmer or timer periodically starts up the motor in one direction, and the subsequent reversing and stop functions are controlled by appropriately spaced limit switches. The speed of source and detector travel is not critical but may range, for example, from about 1 foot/min. to about 10 feet/sec. The upper speed limit is set by the capability of the drive mechanism and also by the response time of the detector. With respect to the latter criteria, it is desirable that the detector response to a step change in radiation intensity be at least about 95 percent complete within the time required for the detector to move about 3 inches; this will insure an interface locating accuracy no poorer than 1 percent for a vessel of 25 feet or more in height. For outdoor installation, the drive mechanism will preferably be protected by a suitable weatherproof roof, housing or enclosure.

Figure 5:
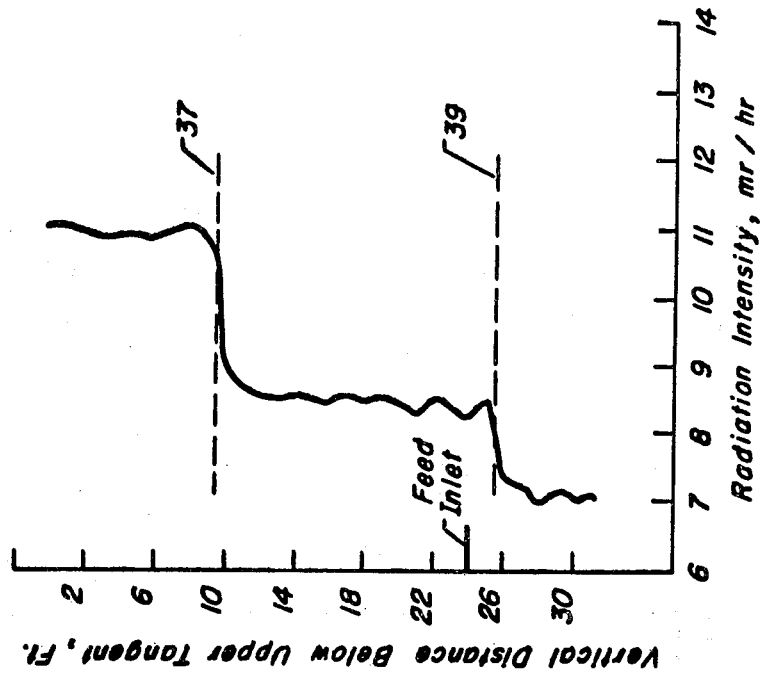
FIG. 5 is a chart illustrating a typical output curve of the apparatus as utilized in FIG. 1.

The detector 18 is electrically coupled through lead wires 22 to a strip-chart recorder 23. Recorder 23 may be locally mounted near the vessel on a platform or at grade, or may be remotely installed in a control house. A typical response curve of an interface detector, utilized on an acid settler of the type shown on FIG. 1, is given in FIG. 5 in which radiation intensity is plotted along the abscissa and vertical distance below the upper tangent line of the vessel is plotted along the ordinate. Specifications of the major components of the apparatus are as follows:

| | |
|---|---|
| Acid Settler: | 7 feet ID × 29 feet 6 inches (Tang length) × 13/16 inch wall thickness, carbon steel |
| Source Housing: | 2 inches Sch 80 carbon steel pipe, 42 feet long |
| Distance from center line of source housing to vertical wall of settler: | 14 inches |
| Source: | Capsulated point source, Ra 226 |
| Detector: | Model 121 Geiger Counter with gamma probe, manufactured by Precision Radiation Instruments, Inc. |
| Readout Instrument: | Millivolt recorder, manufactured by Honeywell |

The position of the emulsion-hydrocarbon interface is indicated by a dashed line 37 and the position of the HF-emulsion interface is indicated by a dashed line 39. Proceeding downwardly from the top of the settler, at line 37, or about 10 feet, the radiation intensity drops sharply from about 11 milliroentgens per hour to about 8.5 milliroentgens per hour; at line 39, or about 26 feet, the radiation intensity again drops from 8.5 milliroentgens per hour to about 7 milliroentgens per hour. The breaks in intensity are somewhat rounded due to the fact that the interfaces are not perfect planes but rather are regions of small but finite thickness which varies with both time and position across the vessel. Nevertheless, the breaks are sufficiently sharp so that the location of the interfaces may be pinpointed to within two or three inches.

Curves of this nature may be readily obtained automatically using a cycle timer, as above described, to control the drive mechanism for periodic traverses of vessel height, a dual input or X-Y recorder as the readout device, and a position servo carried by the detector frame to drive one channel of the recorder. The apparatus may also be adapted to generate a signal suitable for automatic control of interface height through the use of several peripheral components well known to those skilled in the control system art. Such additional components would include, for example, a peak-picker or valley-picker, either mechanical or electronic, or a derivative circuit to develop a signal corresponding to the interface height (determined as the elevation at which the rate of change of intensity with elevation is a maximum), a register or signal storing means to retain the height signal between successive traverses, a set point generator, an error comparator and a control function generator for activating a final control element, such as an air motor valve, in response to the error obtained. In the case of an HF settler, the controlled parameters may be acid recycle rate, hydrocarbon drawoff rate, feed rate or fresh acid make-up rate.

As indicated above, the source housing conduit may have several different configurations. A preferred embodiment is as shown in FIG. 1, namely a straight vertical pipe extending completely through the vessel and sealed to both upper and lower heads. Such straight-through design offers easy access to its interior and provides a means for draining condensed moisture. In addition, the straight-through design is well suited for high temperature service whereby, in order to protect the radioactive source from damaging temperatures, a stream of air, water or other fluid coolant may be continuously passed through the conduit. An alternative arrangement is to extend the conduit through one endwall only, the inner end of the conduit being sealed and terminating short of the other endwall. A third possible arrangement is to form the upper end of the conduit into a 90° bend and extend it through the vertical sidewall of the vessel instead of the top.

Although the invention is especially advantageous for locating liquid-liquid interfaces, other applications will suggest themselves to those skilled in the art. These include ordinary liquid level gauges or transmitters where, for one reason or another, conventional level instrumentation would prove unsatisfactory. The instant invention may be used to monitor the level of a fluidized catalyst bed in the reactor or the regenerator of a fluid catalytic cracking unit. The invention may be also used to locate liquid-liquid interfaces in a multi-stage countercurrent liquid-liquid extraction column or to determine the liquid level and/or froth height on each of a number of fractionating trays in a multi-stage fractionating column.

We claim:

1. Interface sensing apparatus for use and in combination with a closed vessel containing at least two interfaces between three superimposed liquid phases in direct mutual contact, said phases including an upper hydrocarbon phase, an intermediate mineral acid-hydrocarbon emulsion phase and a lower mineral acid phase, which apparatus comprises:

1. A substantially vertical conduit supported within the vessel and extending through a wall thereof to the exterior of the vessel, at least that portion of the conduit which is within the vessel being imperforate and fluid-tight;

2. a vertically translatable radiation source within said conduit arranged to emit radiation outwardly through the conduit and a wall of the vessel;
3. a vertically translatable radiation detector means disposed exteriorly of the vessel and substantially horizontally of said source in a position to intercept transmitted radiation emitted therefrom;
4. drive means coupled to said source and to said detector means for synchronously raising and lowering the source and detector means in parallel paths of travel;
5. control means connected to said drive means operative to cause said source and detector means to periodically traverse at least a portion of the height of said vessel including the two planes of contact between said three phases and independently of the elevation of said planes of contact; and,
6. readout means electrically coupled to said detector means.

2. The apparatus of claim 1 further characterized in that said radiation source is a capsulated point source.

3. The apparatus of claim 1 further characterized in tht said radiation source comprises radium.

4. The apparatus of claim 1 further characterized in the provision of detector guide means disposed along the exterior of said vessel and engaging said detector means for preventing movement of said detector means in all directions except along its path of travel.

5. Interface sensing apparatus, for use and in combination with a closed cylindrical vessel containing at least two interfaces between three superimposed liquid phases in direct mutual contact, said phases including an upper hydrocarbon phase, an intermediate mineral acid-hydrocarbon emulsion phase and a lower mineral acid phase, which apparatus comprises:

1. a substantially vertical tubular conduit supported within the vessel and extending through the upper endwall thereof to the exterior of the vessel, at least that portion of the conduit which is within the vessel being imperforate and fluid-tight;
2. a vertically translatable radiation source within said conduit arranged to emit radiation outwardly through the conduit and a wall of the vessel;
3. a vertically translatable radiation detector means disposed exteriorly of the vessel and substantially horizontally of said source in a position to intercept transmitted radiation emitted therefrom;
4. drive means coupled to said source and to said detector means for synchronously raising and lowering the source and detector means in parallel paths of travel independent of changes in interface level;
5. means connected to said drive means operative to cause said source and detector means to periodically traverse at least a portion of the height of said vessel including the two planes of contact between said three phases and independently of the elevation of said planes of contact; and
6. readout means electrically coupled to said detector means.

6. The apparatus of claim 5 further characterized in that said vertical tubular conduit is centered on a line parallel to and radially displaced from the central longitudinal axis of said cylindrical vessel.

7. The apparatus of claim 5 further characterized in that said vertical tubular conduit extends through the lower endwall of said vessel to the exterior thereof.

8. The apparatus of claim 7 further characterized in that the lower end portion of said vertical tubular conduit is enclosed by a lead shield.

9. The apparatus of claim 5 further characterized in that said radiation source is a capsulated point source.

10. The apparatus of claim 5 further characterized in that said radiation source comprises radium.

11. Interface sensing apparatus, for use and in combination with a closed vertically elongated cylindrical vessel containing at least three superimposed liquid phases in direct mutual contact, said phases including an upper hydrocarbon phase, an intermediate mineral acid-hydrocarbon emulsion phase and a lower mineral acid phase, which apparatus comprises:

1. a substantially vertical tubular conduit supported within the vessel and extending through the upper endwall thereof to the exterior of the vessel, at least that portion of the conduit which is within the vessel being imperforate and fluid-tight, and said conduit being centered on a line parallel to and radially displaced from the central longitudinal axis of said vessel;
2. a vertically translatable radiation source within said conduit arranged to emit radiation outwardly through the conduit and a vertical wall of the vessel;
3. a vertically translatable radiation detector means disposed exteriorly of said vertical wall and substantially horizontally of said source in a position to intercept radiation emitted therefrom;
4. drive means coupled to said source and to said detector means for synchronously raising and lowering the source and detector means in parallel paths of travel;
5. detector guide means disposed along the exterior of said vertical wall and engaging said detector means for preventing movement of said detector means in all directions except along its path of travel;
6. means connected to said drive means operative to cause said source and detector means to periodically traverse at least a portion of the height of said vessel including the two planes of contact between said three phases and independently of the elevation of said planes of contact; and
7. readout means electrically coupled to said detector means.

12. The apparatus of claim 11 further characterized in that said vertical tubular conduit extends through the lower endwall of said vessel to the exterior thereof.

13. The apparatus of claim 12 further characterized in that the lower end portion of said conduit is enclosed by a lead shield.

* * * * *